Patented Sept. 17, 1929

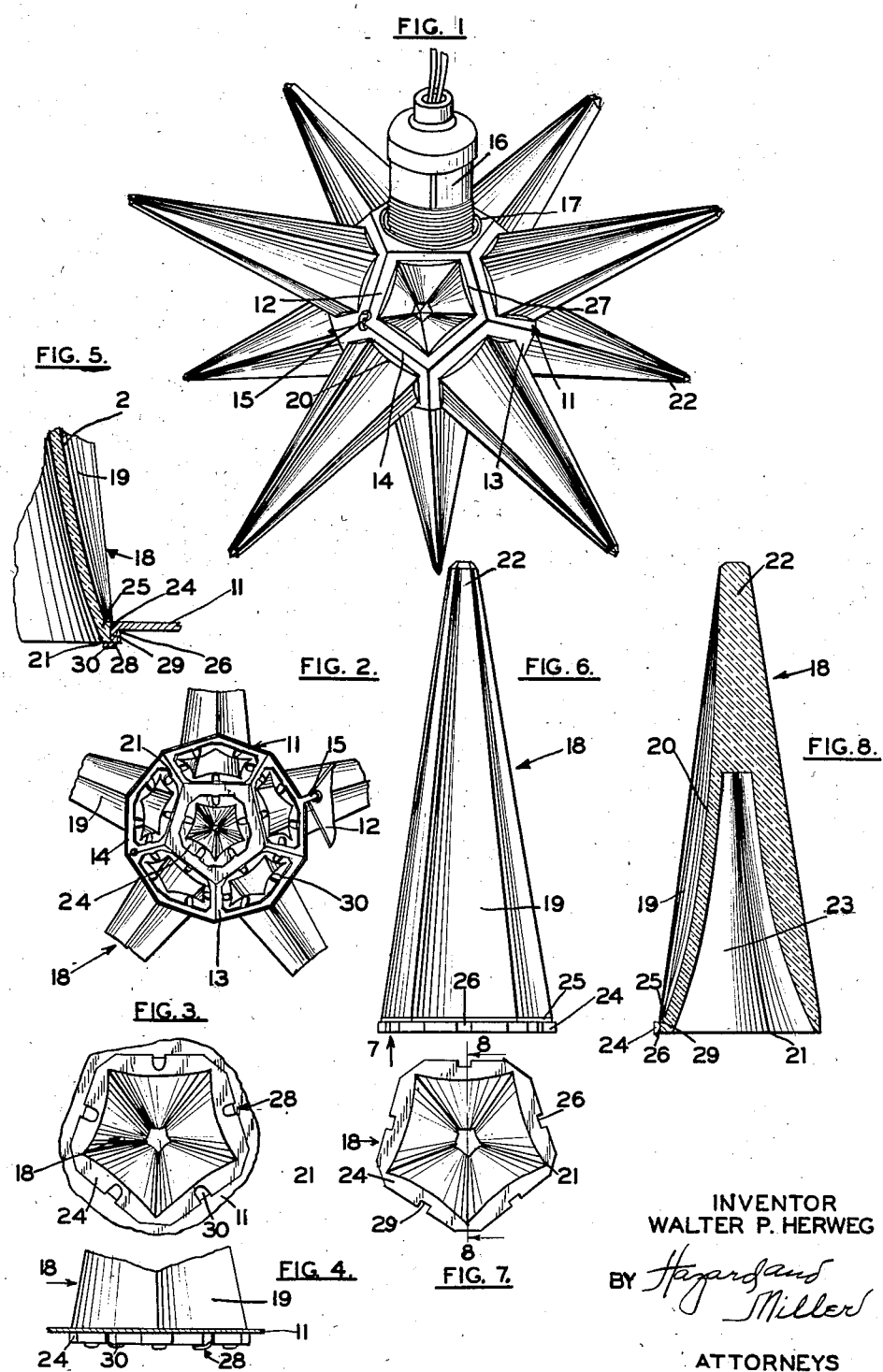

1,728,547

UNITED STATES PATENT OFFICE

WALTER P. HERWEG, OF LOS ANGELES, CALIFORNIA

STAR-SHAPED ELECTRIC-LIGHT FIXTURE

Application filed June 13, 1928. Serial No. 285,136.

My invention is a star-shaped electric light fixture.

My construction involves a star-shaped electric light fixture in which somewhat conical-shaped glasses extend outwardly from the central body structure. These glasses transmit the light from an internal electric lamp bulb and give the effect of a star-shaped structure having a plurality of points.

Another feature of my invention comprises a body structure with a multiplicity of sides from which the somewhat conical glasses extend, these glasses being molded to the proper shape and held in place by metal clips so that their axes are in a position substantially radial to the center of an electric light bulb mounted in the casing or housing.

In the particular form of my invention I utilize a 12-sided housing or casing structure and in which an electric lamp socket is connected to the upper side. There are five sides inclined upwardly, each having pyramidal or conical-shaped glasses. There are also five sides inclined somewhat downwardly, each having a glass pyramidal structure staggered in relation to the upper side. A single pyramidal glass structure depends from the bottom side of the casing or housing. This casing is divided in any suitable manner so that access may be had to the interior to install or replace the lamp.

My invention is illustrated in the accompanying drawings, in which:

Fig. 1 is a perspective view of a fixture illustrating my invention,

Fig. 2 is a plan view of the lower section of the housing, showing the manner of attachment of the glasses, Fig. 3 is an enlarged plan of one of the sections showing the fitting of a glass, Fig. 4 is a side elevation of the base of one of the glasses showing the metal housing securing the glass in place, Fig. 5 is a detail section through part of the housing and part of one of the glasses showing the clip arrangement for holding the glass, Fig. 6 is an elevation of one of the glasses, Fig. 7 is an inside plan view taken in the direction of the arrow 7 of Fig. 6, Fig. 8 is a section of one of the glasses on the line 8—8 of Fig. 7 in the direction of the arrows.

In constructing my invention I form a metal housing 11 which has an upper section 12 and a lower section 13, these having an irregular junction line 14 with a hinge 15 connecting them together. This housing is illustrated as having twelve sides and each side forming a 5-sided figure.

A lamp socket 16 is secured in an opening 17 in the top of the housing; and an electric lamp, preferably of a spherical type, is mounted in the socket inside the housing. The housing, as above mentioned, has the hinge 15 or any other type of hinge, and is secured together in any suitable manner.

Glasses 18 may be transparent or translucent and may be molded in a variety of shapes. The shape illustrated is somewhat pyramidal having five sides 19; and each of these sides is somewhat fluted as indicated at 20, having an exposed concave curvature considered both in a longitudinal and transverse direction. Thus the glasses have five distinct corners 21 and have solid glasses at the apex portion 22, and are preferably hollow in the lower portion 23. A flange 24 is formed integral with the glasses at their lower edge and above this flange there is a slight rim 25. The flange has a series of grooves 26 formed therein extending in a longitudinal direction.

Each of the sides of the housing has an opening 27 formed with five sides; and on each side there is a clip or finger 28. The edge of the opening fits against the flat portion 29 of the glasses and the flange 24 of the glasses fits inside of the structure of the housing so that the clips or fingers 28 may extend inwardly through the grooves 26 and have their inner ends bent over as indicated at 30, thus securing the glasses in position. It will, therefore, be seen that there are five of these clips engaging the flange of each glass on the five sides.

It is obvious that any other type of casing or housing may be utilized to contain the electric lamp, and that the glasses may be secured in position in any desired manner. It is my intention, however, that the glasses be completely molded or shaped in the desired pyramidal or conical shape, and that therefore when the light is transmitted through the glasses there is no obstruction formed by leaded corners or the like.

It is also apparent that if desired the glasses may be made solid or hollow as illustrated; and they may be made of thin material having the requisite strength and in any desired colors.

A feature of my invention is that the pyramidal glasses 18 have walls of different thicknesses as illustrated by the construction of Fig. 8 and also there is a hollow or concave portion 20 forming a type of fluting. This causes the glasses to act in a prismatic manner, giving a dispersion to the light projected therethrough from the lamp mounted in the center of the fixture. This therefore gives a pleasing effect.

Various changes may be made in the principles of my invention without departing from the spirit thereof, as set forth in the description, drawings and claims.

I claim:

1. In a lighting fixture a lamp housing having an opening, a pyramidal-shaped glass having a flange fitted therein, and bent finger clips engaging said flange and holding the glass in position.

2. A lighting fixture having a lamp housing with an opening, a pyramidal-shaped glass fitted in said opening and having a flange on the inside of the housing with a plurality of grooves, and a plurality of bent finger clips engaging the said grooves and holding the glass in position.

3. A lighting fixture comprising in combination a multisided lamp housing, most of the sides having an opening, a pyramidal-shaped molded glass fitted in each opening, each glass having a flange, and a plurality of bent finger clips engaging each flange and holding each glass in position.

4. A lighting fixture comprising in combination a multi-sided lamp housing, most of the sides having an opening, a pyramidal-shaped molded glass fitted in each opening and each of the glasses having walls of varying thicknesses giving a prismatic effect to the light transmitted therethrough.

5. A lighting fixture comprising in combination a multi-sided lamp housing, most of the sides having an opening, a pyramidal-shaped molded glass fitted in each opening, each glass having a flange, a plurality of bent finger clips engaging each flange to hold each glass in position, each glass having walls of varying thickness, whereby a prismatic effect is given by light transmitted from a lamp located centrally in the housing.

6. A lighting fixture having in combination a multi-sided lamp housing, each side having a framing with five sides and an opening in the framing, a pyramidal-shaped glass mounted in each of the framings, said housing being formed in two sections separable along an irregular line formed by the sides of the different framings, the housing being divided into substantially two equal parts.

7. A lighting fixture comprising in combination a multi-sided lamp housing, each side having five edges, the edges being common to the other sides, most of the sides being open and having a five sided pyramidal glass fitted therein, the housing being divided into two substantially equal parts on an irregular line following the junction edge of a number of the sides.

In testimony whereof I have signed my name to this specification.

W. P. HERWEG.